Dec. 12, 1933.    H. ERNST ET AL    1,938,772
HYDRAULIC DRIVE FOR MILLING MACHINES
Filed March 8, 1930    2 Sheets-Sheet 1
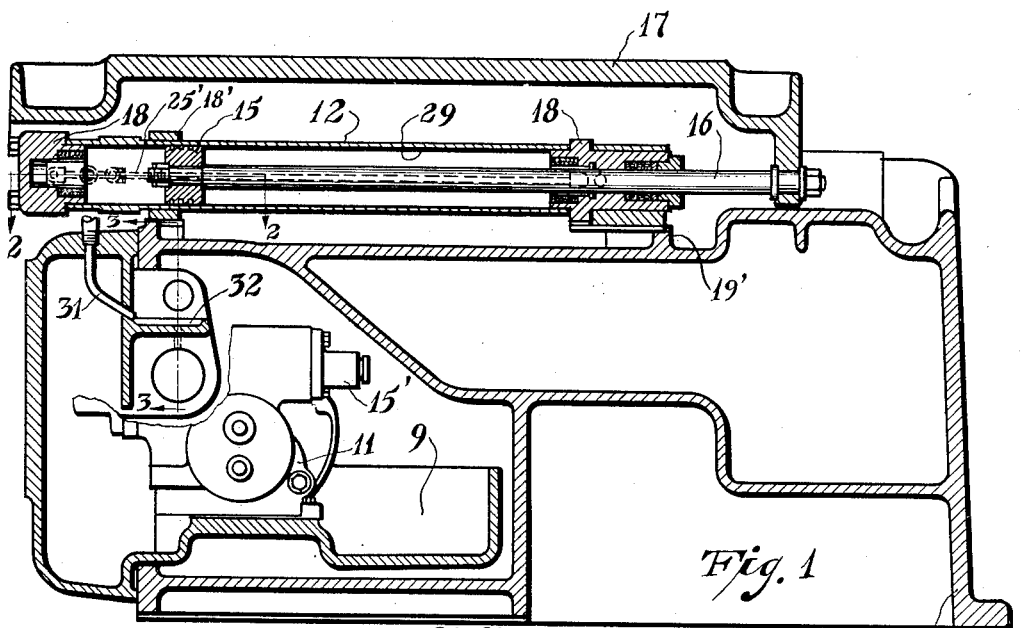
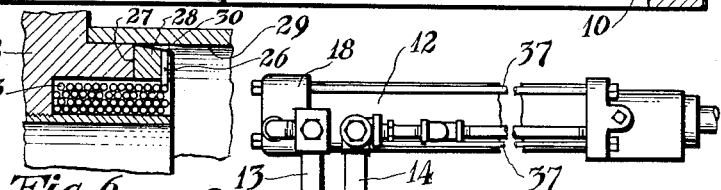
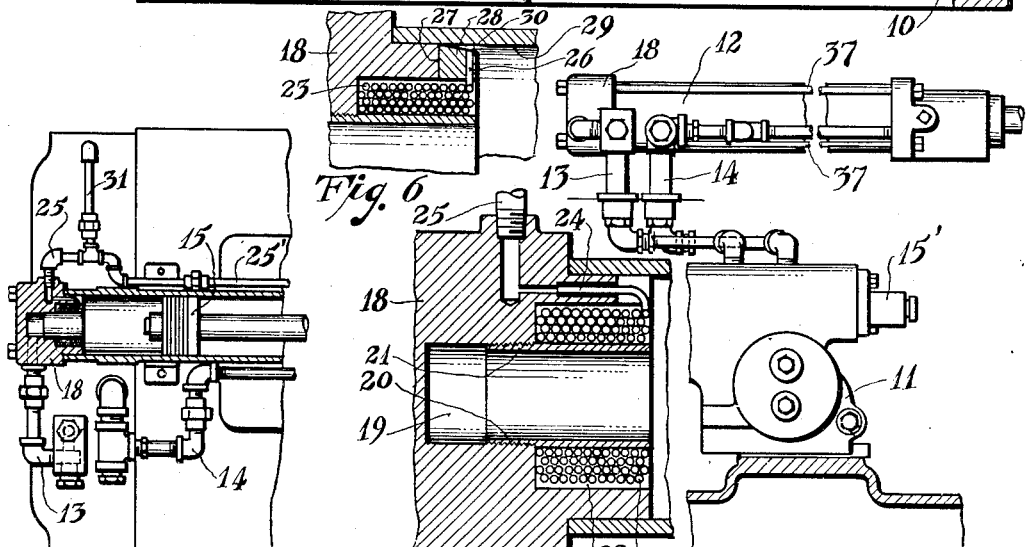
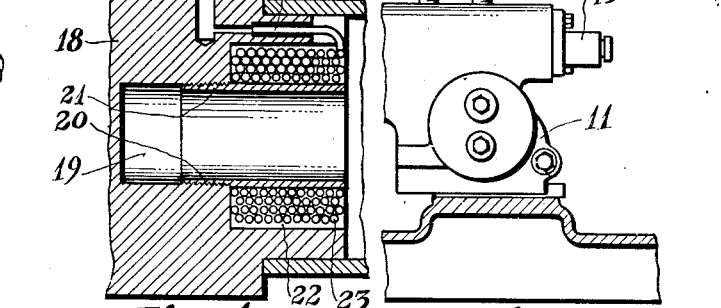
Inventor
HANS ERNST
HERMAN R. ISLER
By H. K. Parsons
Attorney

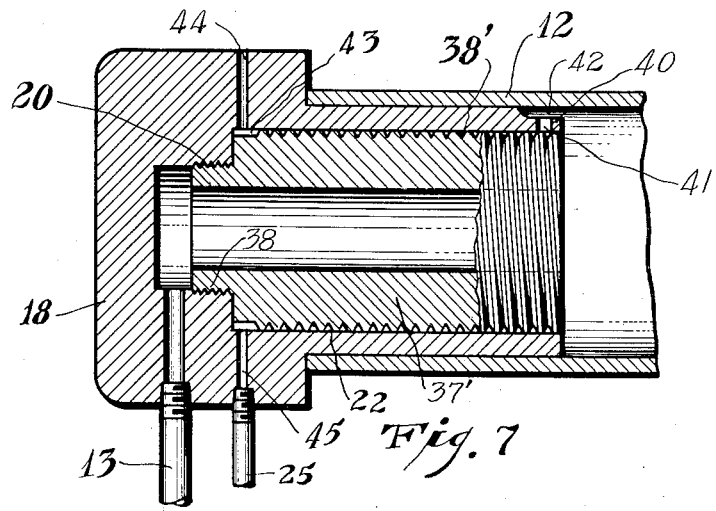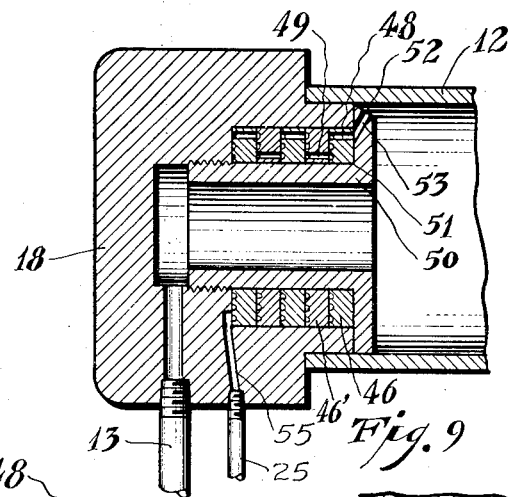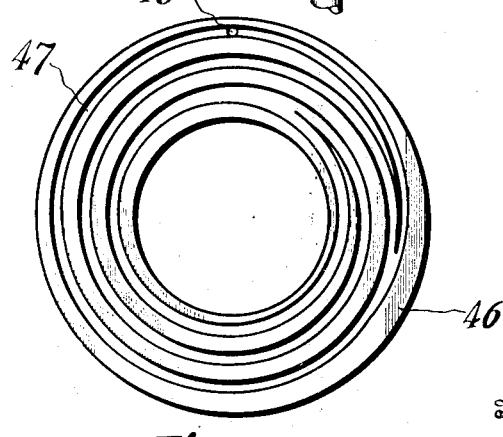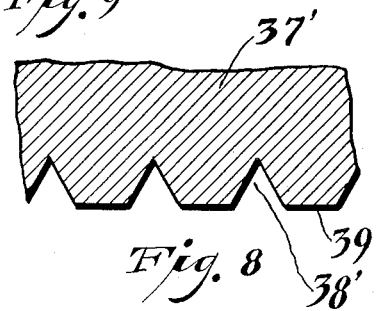

Patented Dec. 12, 1933

1,938,772

UNITED STATES PATENT OFFICE 1,938,772

HYDRAULIC DRIVE FOR MILLING MACHINES

Hans Ernst, Cincinnati, and Herman R. Isler, Norwood, Ohio, assignors to The Cincinnati Milling Machine Company, Cincinnati, Ohio, a corporation of Ohio Application March 8, 1930. Serial No. 434,416

4 Claims. (Cl. 60—52)

This invention relates to hydraulically operated machine tools and more particularly to improvements in hydraulic systems for use with such tools In the operation of hydraulically actuated machine tools it is well recognized that there is a tendency for air to collect in the system which may be due to several causes such as air being drawn into the system at points where the pressure is lower than atmospheric pressure or more commonly it may become entrained in the oil in the reservoir by vortices formed when the oil is discharged from pipes either close to or above the surface. On account of air being compressible its presence in the system is undesirable as it causes irregular movements in the work of the machine tool.

It is therefore one of the principle objects of this invention to provide means whereby a gas such as air which is lighter by volume than the operating medium may be collected and expelled from the system.

Another object of this invention is to provide an air bleeder which may be incorporated in one of the existing elements of the system without encumbering the machine as would be the case if separate apparatus and piping were used for this purpose.

A further object of this invention is to provide an air bleeder which may be mounted in the hydraulic motor when the motor is situated at the highest point in the hydraulic system.

A still further object of this invention is to provide means whereby the oil which passes off with the air through the bleeder may be used for lubricating purposes.

An additional object of this invention is the provision of a bleeder for an hydraulic system which will facilitate the exit of air from the system and at the same time retard the exit of oil or other fluid.

A still further object of this invention is a new method of producing an air bleeder or choke passage for hydraulic systems.

Other objects and advantages of the present invention should be readily apparent by reference to the following specification considered in conjunction with the accompanying drawings illustrative of one embodiment thereof and it will be understood that any modifications may be made in the exact structural details hereinafter described within the scope of the appended claims without departing from or exceeding the spirit of the invention.

Referring to the drawings in which like reference numerals indicate like parts.

Figure 1 is a vertical section of a machine tool showing one embodiment of the invention.

Figure 2 is a fragmentary section on the line 2—2 of Figure 1.

Figure 3 is a section on the line 3—3 of Figure 1.

Figure 4 is an elevation showing the piping from the pump to the operating cylinder.

Figure 5 is a detail view of one form of bleeder.

Figure 6 is a detail view showing the connection between the bleeder inlet and the cylinder.

Figure 7 is a sectional view showing a modification of this invention.

Figure 8 is a detail of the grooves formed in the bleeder cylinder.

Figure 9 is a sectional view showing another modification of this invention.

Figure 10 is a detail of one of the bleeder plates shown in Figure 9.

Referring to Figure 1 reference numeral 10 indicates the base of a conventional hydraulically operated machine tool provided with a source of hydraulic pressure such as the pump 11 for operating a hydraulic motor which in the present invention is in the form of a cylinder 12 to which pressure is supplied from the pump through channels such as the pipes 13 and 14.

These pipes are connected to supply pressure to the opposite ends of the cylinder 12 for operating a piston 15 reciprocably mounted therein which is attached to the end of a piston rod 16 for actuating a movable part of the machine such as the work table 17. The operation of the parts is such that as the pump is supplying an actuating medium to one end of the cylinder through the pipe 13 for instance the medium is being withdrawn from the other end of the cylinder as through the pipe 14 and in order to provide for continuous reciprocation of the movable part, a reversing valve 15¹ is used which in this case is incorporated in the pump casing. Additional pump means (not shown) may be provided for maintaining the system full of a fluid from a reservoir 9 in the base of the machine. The cylinder 12 is mounted on the frame of the machine and held against longitudinal movement by the anchorage 19¹. This connection it will be noted is at only one point, the other end of the cylinder merely resting in the bracket 18¹. This allows for any expansion or contraction of the cylinder due to heat developed during its operation. The cylinder heads 18 are fitted on each end of the cylinder and may be drawn towards each other into sealing contact with the ends of the cylinder as by the tie or tension rods 37 which are equally spaced about the periphery of the cylinder. Each cylinder head has formed therein a central bore 19 a portion of which is counterbored as at 22. The bore 19 is threaded for part of its length as at 20 to receive the short section of pipe or tubing 21, which extends into the larger bore 22 to form an annular pocket for the reception of an air bleeder.

In providing an air bleeder for the purpose contemplated in this invention it is necessary that it be of such a type that it will allow the air to pass or escape to the atmosphere without at the same time causing too great a loss of fluid from the system. One efficient means for accomplishing this purpose is the provision of a channel of comparatively small bore and great length which will permit the escape of air while at the same time have sufficient frictional resistance to retard the passage of oil.

One form that this channel might take is shown in Figures 5 and 6 in which the bleeder is formed of a number of turns of small bore tubing. The tubing is wound in the form of a coil 23 as shown in Figure 5 and then inserted in the annular space 22 with one end of the tube sealed in the bore 24 which communicates with the outlet pipe 25 and with the other end 26 in a radial slot formed in the inner face of the cylinder head. After the bleeder is in place the slot is filled with a substance having a low melting point such as babbit and then the peripheral end of the material in the slot is beveled off as shown at 28 in Figure 6, which beveled surface in conjunction with the cylinder bore forms a pocket or air trap.

From the construction as thus explained it will be seen that any air that is in the hydraulic system will gradually find its way to the upper surface 29 of the cylinder and become collected thereon due to the air being lighter than the operating medium and also to the fact that the surface 29 is located at the highest point in the system. The pocket 30 previously described is adapted to trap the collected air bubbles as they are forced along the surface 29 by the movement of the piston; and the pressure in the cylinder will force the air through the bleeder to the outlet pipe 25 and thus expel it from the system.

A bleeder or drain of similar construction is mounted in the opposing cylinder head and operates in a similar manner discharging into an outlet pipe 25'. The pipes 25 and 25' are connected to a common discharge pipe 31. Since it is impossible to remove the air without removing some of the oil, advantage is taken of this condition by connecting the pipe 31 with a lubricating system so that the oil upon its return to the reservoir in the base of the machine may lubricate some of the parts thereof.

One form that this construction might take is shown in Figures 1 and 3 where the pipe 31 is led to the small reservoir 32 in which the oil may accumulate and the air separate therefrom. Channels 33 and 34 are provided for conducting the oil from this reservoir to the bearings such as 35 and 36. The oil or lubricant may then drain from these bearings to the reservoir in the base of the machine. Although only two bearings have been shown it is of course understood that any number of bearings may be lubricated in this manner.

Another modification of the air bleeder is shown in Figure 7 where the member 37' is substituted for the coil of tubing 23. This member is tubular in form and may have a reduced end portion 38 which is threaded for engagement with the threaded portion 20 of the cylinder head. A continuous spiral groove or thread 38' is formed on the larger diameter of the member 37' for cooperation with the bore 22 of the cylinder head to form a long continuous spiral channel.

To this end the large diameter of the member 37 is finished to a smooth surface for a tight fit with the finished surface of the bore 22. It will be noted from Figure 8 that the groove is cut so that a land 39 is formed coextensive with the groove which surface tightly engages the bore 22 cooperating therewith to form a closed channel and causing the flow to follow the path of the groove.

A beveled surface 40 is formed as before and a hole 41 is provided to afford communication between the pocket 42 and the spiral channel. A reduced portion 43 is formed on the member 37 next to the shoulder which in cooperation with the cylinder head forms an annular groove which communicates at the top with the channel 44 formed in the cylinder head, and at the bottom with the channel 45. The channel 44 being at the top permits the air to escape to the atmosphere while the channel 45 acts as a reservoir to collect the oil which passes through the bleeder with the air, and is connected with the outlet pipe 25 in a similar manner as the bleeder shown in Figure 2.

Attention is invited to the fact that the groove 38' may be of any length but it is intended that it will be of sufficient length and thereby have sufficient frictional resistance that the oil will emerge from the outlet at a relatively slow rate. Thus the oil is held back in the system while at the same time the air is permitted to escape.

Another embodiment or modification which this invention might take is shown in Figures 9 and 10. In this instance a long continuous spiral groove is formed by providing a plurality of discs or plates 46 and 46' having a convoluted groove 47 formed on one face of each. The plates are assembled in the bore 22 as shown in Figure 9 with the grooved face of one plate in contact with the back of the next plate, thereby forming a closed channel in a manner similar to that explained in the previous modification. In order to provide a single continuous path, holes such as 48 and 49 are provided in the alternate plates 46 and 46' respectively so that the air will flow in a spiral path toward the center of one plate and away from the center in the next plate. A retainer bushing 50 is threaded in to the cylinder head and has a shoulder 51 for holding the plates in position. A beveled surface 52 is again provided to form a pocket for collecting the air and a channel 53 formed in the member 50 for connecting the pocket with the spiral channel formed by the plates. As in a preceding embodiment a hole 55 is provided through which the air and oil may drain to the outlet pipe 25.

That which is claimed is:

1. A machine tool having in combination a piston and cylinder for operating a part, means to force a liquid medium into the cylinder for reciprocating said part, a pocket formed in the end of the cylinder the upper surface of the cylinder bore forming one side thereof and means to force air collected on the surface into said pocket and expel it from the cylinder continuously during actuation of the part.

2. In a machine tool having a reciprocating support and an hydraulic motor comprising a piston and cylinder for effecting reciprocation of the support, said cylinder being formed of a tubular member having cylinder heads telescopingly attached to each end, the combination of means for eliminating foreign gases from the hydraulic medium and thereby maintaining a solid body of liquid in the cylinder during actuation of the piston to insure uniform movement of the support comprising a discharge channel connected to one end of a cylinder head, the opposite end of the head having an indentation formed therein cooperating with the wall of the tubular member to form a gas trapping pocket, and means to connect the pocket to said discharge comprising a tubular member having a thread cut in its periphery, a counter-bore formed in the end of the cylinder head for receiving said member, the wall of the counter-bore cooperating with the thread to form a closed channel of sufficiently small cross section to prevent the free flow of the hydraulic medium therethrough while permitting the seepage of gas, radial channels connecting one end of the closed channel to the pocket and the other end of the channel to the discharge channel, and means to fix the member in said counterbore to maintain said connections.

3. In a machine tool having a reciprocating support and an hydraulic motor comprising a piston and cylinder for effecting reciprocation of the support, said cylinder being formed of a tubular member having cylinder heads telescopingly attached to each end, the combination of means for eliminating foreign gases from the hydraulic medium and thereby maintaining a solid body of liquid in the cylinder during actuation of the piston to insure uniform movement of the support comprising a discharge channel connected to one end of a cylinder head, means adjacent the opposite end of the head cooperating with the wall of the tubular member to form a gas trapping pocket, means to connect the pocket to said discharge comprising a plurality of annular disks, a spiral groove formed in a face of each disk, said disks being successively arranged with grooved faces engaging plane backs to form closed channels, longitudinal passages formed in the disks for connecting alternately a pair of inner ends and then a pair of outer ends of the grooves to produce one continuous tortuous channel through the several discs, the cross section of said channel being sufficiently small to prevent the free flow of the hydraulic medium while permitting the seepage of gas, said head having a counterbore formed therein for receiving the disks, means to retain the disks in said counterbore, and radial channels connecting one end of said continuous channel to the pocket and the other end to the discharge channel.

4. In a machine tool having a reciprocating support and an hydraulic motor comprising a piston and cylinder for effecting reciprocation of the support, said cylinder being formed of a tubular member having cylinder heads telescopingly attached interiorly of the ends thereof, each cylinder head having a port formed therein for alternate subjection to fluid pressure to effect reciprocation of the piston, the combination of means for eliminating foreign gases from the fluid medium and thereby maintaining a solid body of liquid in the cylinder comprising an annular bleeder coil mounted in the end of the cylinder head between the port and the inner end, said bleeder coil having a central passage for conducting the fluid from said port to the cylinder for actuation of its piston, an indentation formed on the inner end of the head cooperating with the wall of the cylinder to form a gas trapping pocket means to connect one end of the coil to one end of the pocket and the other end to atmosphere whereby foreign gases may be eliminated from the system without interfering with the operation thereof.

HANS ERNST.
HERMAN R. ISLER.